UNITED STATES PATENT OFFICE.

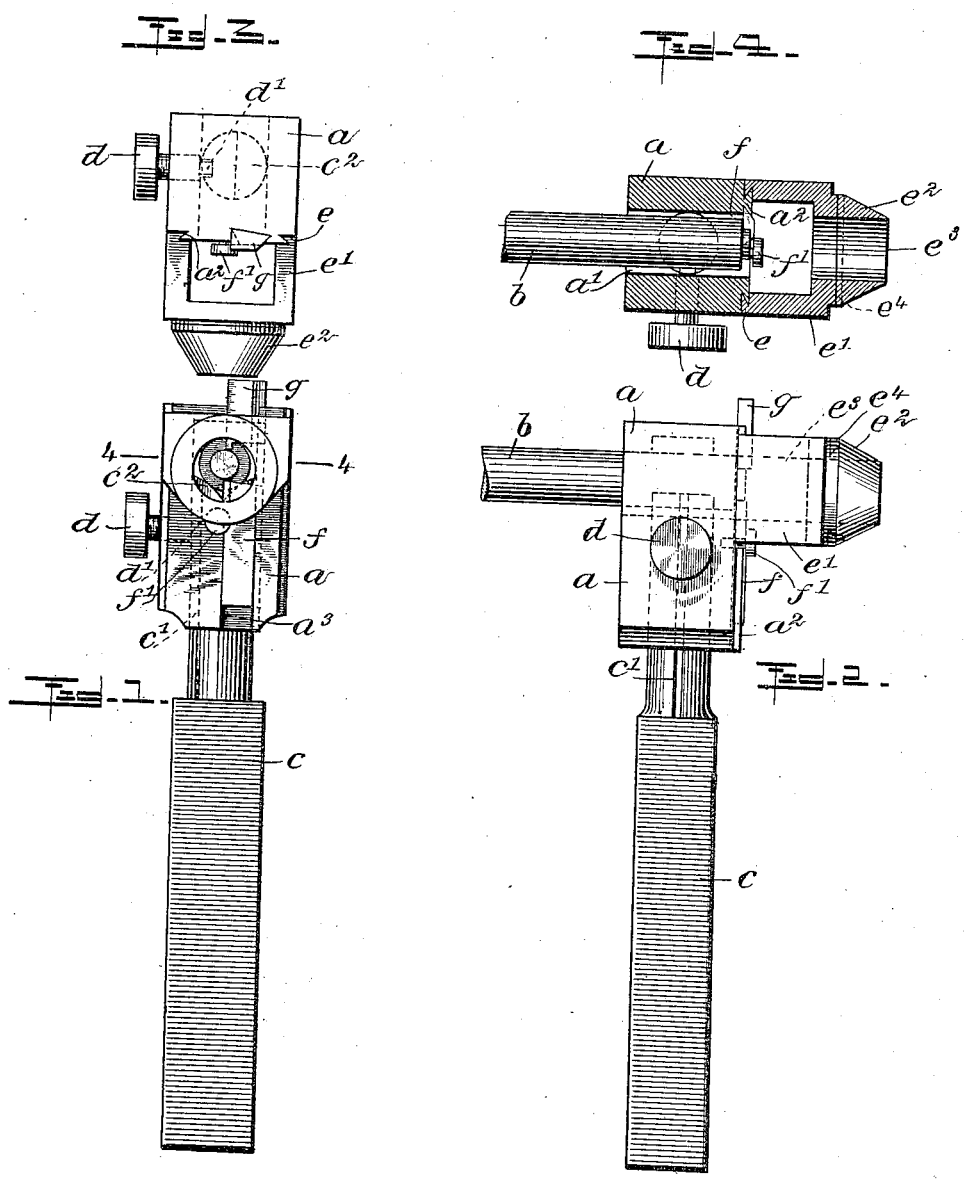

FREDERICK H. HUMMEL, OF NEW YORK, N. Y.

CUTTING-TOOL HOLDER.

No. 858,985.      Specification of Letters Patent.      Patented July 2, 1907.

Application filed January 6, 1906. Serial No. 294,870.

*To all whom it may concern:*

Be it known that I, FREDERICK H. HUMMEL, a citizen of the United States, and a resident of the city of New York, borough of Manhattan, in the county and State of New York, have invented a new and Improved Cutting-Tool Holder, of which the following is a full, clear, and exact description.

My invention relates to a holder for cutting tools, provided with means for centering it in a lathe, and adapted to cut shoulders of any desired size upon the ends of shafts, rods, tubes and the like.

Reference is to be had to the accompanying drawings forming a part of this specification, in which similar characters of reference indicate corresponding parts in all the figures.

Figure 1 is a side elevation of a tool constructed in accordance with the principle of my invention; Fig. 2 is a plan of the same; Fig. 3 is an end elevation, and Fig. 4 is a sectional view on the line 4—4 of Fig. 1.

I have designed the instrument to operate upon a rod, shaft, tube or the like, held by a chuck or face-plate and dog, or in any desired manner, at the head center of a lathe so as to be rotated, and the instrument is intended to be applied to the work and held by hand or other means in a stationary position centered by the tail center of the lathe and fed up to the work by the tail center or other means so that upon rotation of the work the desired operation will be performed upon it by the stationary cutting tool.

For receiving the work I have shown a block or head $a$ having a perforation $a'$ into which the work $b$ is adapted to project. For the purpose of holding the block I have shown a handle $c$ having a groove $c'$ and entering a perforation in the head or block which intersects with the perforation $a'$. A thumb-screw $d$ passes through the head and is provided with a projection $d'$ entering the slot $c'$ so as to hold the handle in any desired position. The inner end of the handle is provided with a V-shaped notch $c^2$ which can be adjusted into the perforation $a'$ as far as may be desired in order to furnish a support for the work $b$. This support is adjustable so as to accommodate work of different sizes. For the purpose of centering the device with respect to the tool center, I have provided the head or block with ways $a^2$ in which operate guides $e$ on a centering device $e'$. This centering device is provided with a projection $e^2$ having a central perforation $e^3$ for receiving the tail center of the lathe in an obvious manner. This projection is preferably made separate from the rest of the centering device $a'$ and slides thereon in way $e^4$ at right angles to the ways $a^2$ to permit universal motion. The centering device is centered transversely on the block by the ways and guides and moves longitudinally with the block so as to allow the tools to conform to the position of the work when it is centered. The cutting operation is performed by means of a tool $f$ which is mounted in a guide-way $a^3$ on the head, and it is fixed in any adjusted position by means of a screw $f'$. The cutting tool projects into the end of the perforation $a'$ so as to engage the work and perform the desired operation, and it may be of any desired shape and size. Projecting into the perforation $a'$ through the grooves $a^3$ exactly opposite the cutting tool $f$ is an adjustable scale $g$ designed to indicate the diameter of the work as it is being cut. This is accomplished by bringing the inner end of the scale in contact with the work and reading the graduation in alinement with the outer edge of the tool head.

Having thus described my invention, I claim:

1. A tool holder comprising a block or head having means for supporting a cutting tool and means for receiving the work, and a centering device slidable on the block or head crosswise of the work adapted to receive the tail center of a lathe.

2. A tool holder comprising a block or head, having a perforation for receiving the work and having means for supporting a cutting tool, said block being provided with ways located on opposite sides of said perforation, and a centering device movable along said ways and having a projection provided with a perforation located opposite the perforation in the block and adapted to receive the tail center of a lathe.

3. A tool holder comprising a block or head having means for supporting a cutting tool and means for receiving the work, and a centering device slidable on the block or head crosswise of the work, adapted to receive the tail center to a lathe, said centering device comprising a projection slidable at right angles to the sliding movement of the centering device and having a central perforation.

4. A tool holder comprising a block or head having a perforation passing through it for receiving the work, a handle passing through the head and entering said perforation, the end of said handle being adapted to support the work, a tool adjustably carried by the head, and a centering device carried by the head adapted to receive the tail center of a lathe.

In testimony whereof I have signed my name to this specification in the presence of two subscribing witnesses.

FREDERICK H. HUMMEL.

Witnesses:
    JNO. M. RITTER,
    ALBERT E. FAY.